United States Patent
Chindapol et al.

(10) Patent No.: US 7,941,724 B2
(45) Date of Patent: May 10, 2011

(54) EMBEDDED RETRANSMISSION SCHEME WITH CROSS-PACKET CODING

(75) Inventors: Aik Chindapol, Princeton, NJ (US); Christoph Hausl, Munich (DE)

(73) Assignee: Nokia Siemens Networks Oy, Espoo (FI)

( * ) Notice: Subject to any disclaimer, the term of this patent is extended or adjusted under 35 U.S.C. 154(b) by 1136 days.

(21) Appl. No.: 11/699,792

(22) Filed: Jan. 30, 2007

(65) Prior Publication Data

US 2007/0253423 A1 Nov. 1, 2007

Related U.S. Application Data (60) Provisional application No. 60/796,514, filed on May 1, 2006.

(51) Int. Cl.
*H04L 1/00* (2006.01)
*H04L 1/16* (2006.01)
(52) U.S. Cl. .................................... 714/751
(58) Field of Classification Search ............ 714/751
See application file for complete search history.

(56) References Cited

U.S. PATENT DOCUMENTS

| | | | | |
|---|---|---|---|---|
| 6,226,769 B1 * | 5/2001 | Schuster et al. | ............. | 714/752 |
| 6,243,846 B1 * | 6/2001 | Schuster et al. | ............. | 714/776 |
| 6,366,959 B1 * | 4/2002 | Sidhu et al. | ............. | 709/231 |
| 6,728,920 B1 * | 4/2004 | Ebersman | ............. | 714/752 |
| 6,851,084 B2 * | 2/2005 | Pattavina | ............. | 714/776 |
| 6,909,758 B2 * | 6/2005 | Ramesh et al. | ............. | 375/340 |
| 7,027,782 B2 * | 4/2006 | Moon et al. | ............. | 455/102 |
| 7,042,833 B1 * | 5/2006 | George et al. | ............. | 370/216 |
| 2003/0118107 A1 | 6/2003 | Itakura et al. | | |
| 2005/0100102 A1 | 5/2005 | Gazdzinski et al. | | |
| 2006/0114826 A1 | 6/2006 | Brommer | | |
| 2007/0147384 A1 | 6/2007 | Pekonen et al. | | |
| 2007/0165035 A1 | 7/2007 | Duluk, Jr. et al. | | |
| 2007/0180349 A1 | 8/2007 | Jacobsen | | |

OTHER PUBLICATIONS

"Draft Standard for Information Technology—Telecommunications and information exchange between systems—Local and Metropolitan Area Networks—Specific Requirements; Part 11: Wireless LAN Medium Access Control (MAC) and Physical Layer (PHY) Specifications: Amendment <number>: Enhancements for Higher Throughput", IEEE P802.11n/D1.08, Dec. 2006, 442 pages.

"Draft Standard for Information Technology—Telecommunications and information exchange between systems—LAN/Man Specific Requirements—Part 11: Wireless Medium Access Control (MAC) and Physical Layer (PHY) Specifications; Amendment v: Wireless Network Management", IEEE P802.11v/D0.06, Nov. 2006, 159 pages.

(Continued)

*Primary Examiner* — Stephen M Baker
(74) *Attorney, Agent, or Firm* — Brake Hughes Bellermann LLP

(57) ABSTRACT

An H-ARQ system wherein the transmission of two consecutive, or sequential, blocks of information bits are considered jointly; i.e., one of the blocks of information being embedded within the other one of the blocks of information. If a retransmission for the first block is necessary, the system processes both blocks jointly. The system is provided with cross-packet coding which extends current H-ARQ schemes for point-to-point communications wherein the transmission of two consecutive block of information bits is considered jointly. If a retransmission for the first block is necessary, the system processes both blocks jointly. This allows both blocks to be decoded without errors at the receiver after the retransmission.

16 Claims, 7 Drawing Sheets

OTHER PUBLICATIONS

IEEE Standard for Information Technology—Telecommunications and information exchange between systems—Local and Metropolitan Area Networks—Specific Requirements; Part 11: Wireless LAN Medium Access Control (MAC) and Physical Layer (PHY) Specifications; Amendment 4: Further Higher Data Rate Extension in the 2.4 GHz Band; IEEE Std. 802.11g-2003, Jun. 27, 2003, 78 pages.

Notice of Allowance for U.S. Appl. No. 12/027,999, mailed Apr. 9, 2010, 18 pages.

Valenti, M C., et al., "The UMTS Turbo Code and an Efficient Decoder Implementation Suitable for Software-Defined Radios", International Journal of Wireless Information Networks, vol. 8, No. 4, (Oct. 2001), pp. 203-215.

* cited by examiner

EMBEDDED RETRANSMISSION SCHEME WITH CROSS-PACKET CODING

CROSS REFERENCE TO RELATED APPLICATION

This application claims priority from U.S. Provisional application Ser. No. 60/796,514 filed on May 1, 2006, which is incorporated herein by reference.

TECHNICAL FIELD

This invention relates generally to data transmission systems and more particularly to data transmission systems wherein data may be required to be re-transmitted.

BACKGROUND

In wireless communication, channel fading and interference noise fluctuate rapidly according to the channel conditions. It is well known that the packet errors occur when the attempted transmission rate is higher than the acceptable channel rate. Several techniques have been used to alleviate this problem. Link adaptation adjusts the transmission rate (and the amount of redundancy) to compensate for this fluctuation. However, it is assumed that the channel is stationary during the adaptation and transmission periods. Whenever error occurs, packet retransmission is often used to ensure reliable packet delivery. In one type of system it may be required to retransmit data. One such system is a Hybrid ARQ techniques such as incremental redundancy and Chase combining have been proposed to improve the spectral efficiency of retransmission. For delay-sensitive applications such as voice and video, retransmission also causes additional delay, which might impact the quality. Thus, in a typical wireless communication system, a packet retransmission is used to recover from channel errors at the cost of additional delay and overhead (spectral efficiency). In addition, for delay-sensitive applications the arrival of retransmitted packets may be too late to be used at the codecs.

More particularly, in current H-ARQ schemes, a channel encoder encodes a block of information bits $u_1$ and outputs a block of code bits $x_1$ which is sometimes referred to as a codeword. The first transmission $x_{11}$ to the receiver contains a part of the codeword. If the receiver cannot decode the codeword without error (The error detection can be done with a cyclic redundancy check (CRC)), a retransmission from the transmitter is necessary. While in ARQ schemes of type I (separate ARQ and FEC), the transmission starts again from the beginning, in H-ARQ schemes the receiver stores the first transmission and the transmitter sends another part of the codeword $x_{12}$ in the second transmission. Then, both parts of the codeword which were received are used for decoding.

In previous works (see J. Nonnenmacher, E. Biersack, and D. Towsley, "Parity-based loss recovery for reliable multicast transmission", ACM SIGCOMM Computer Communication Review, vol. 27, pp. 289-300, October 1997 and H. Lundqvist and G. Karlsson, "TCP with End-to-End Forward Error Correction" Technical Report, TRITA-IMIT-LCN R 03:03, ISSN 1651-7717, ISRN KTH/IMIT/LCN/R-03/03-SE, KTH, Royal Institute of Technology, Sweden) with automatic repeat request (ARQ) and forward error correction (FEC) on the packet level, it is assumed that FEC on the bit level delivers an erasure channel for the packet level. On the packet level a second FEC is done with the complete packets.

Figure 1:
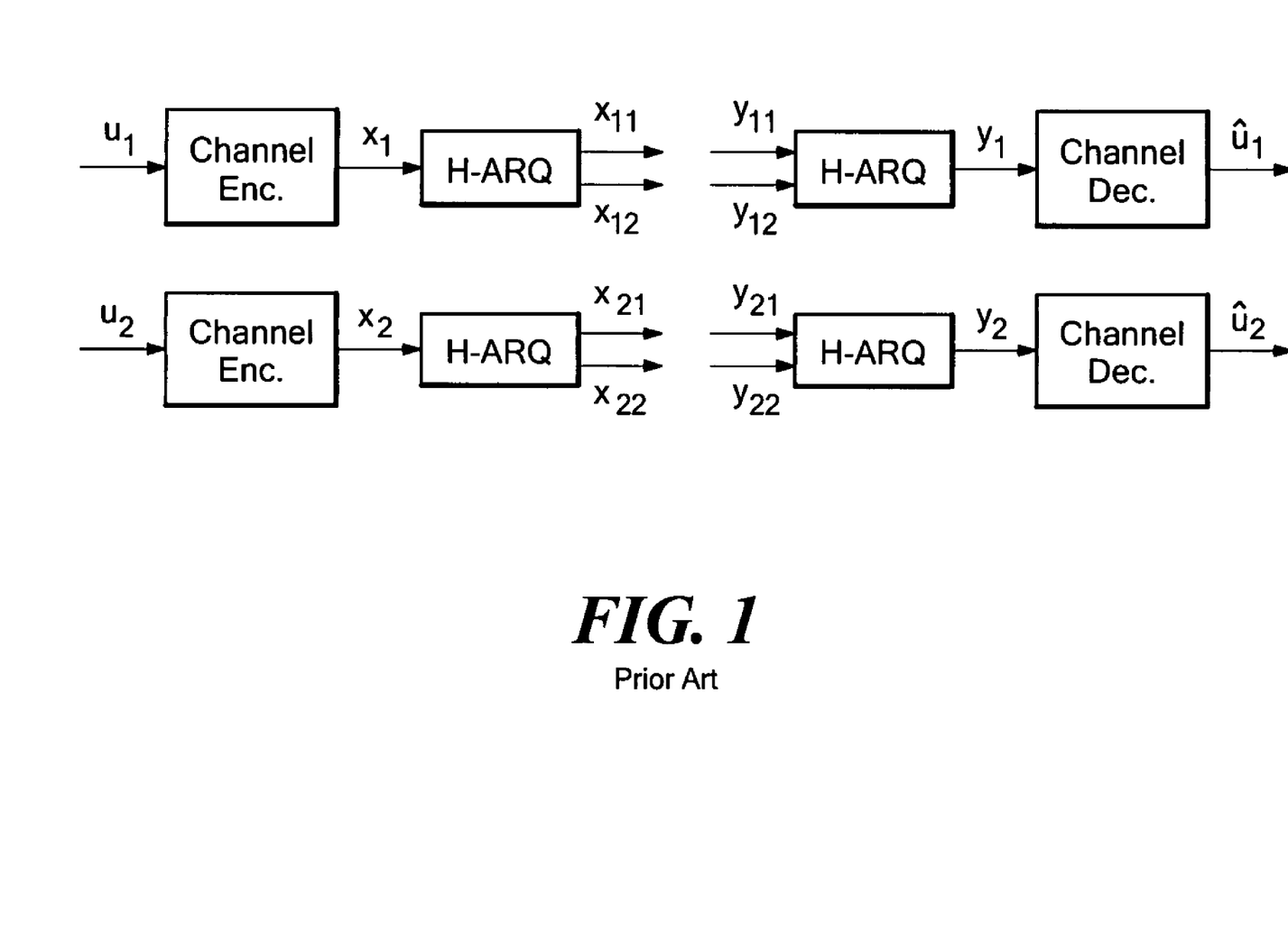
FIG. 1 is a block diagram of a Hybrid Automatic Repeat-reQuest (H-ARQ) system according to the PRIOR ART.
Figure 1A:
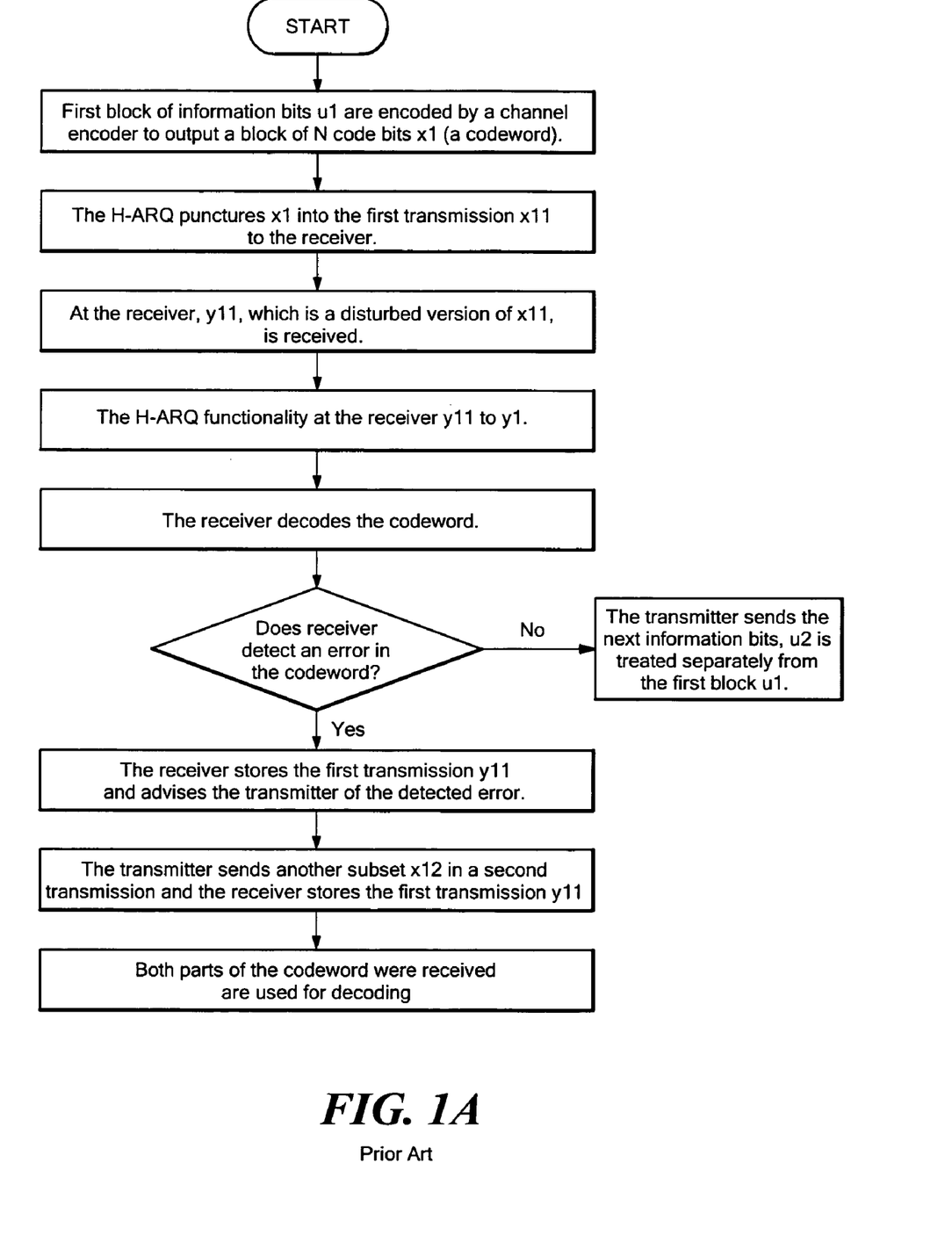
FIG. 1A is a flow diagram of the process used by the Hybrid Automatic Repeat-reQuest (H-ARQ) system of FIG. 1 according to the PRIOR ART.

FIG. 1 shows a conventional H-ARQ system for transmitting two blocks of information bits $u_1$ and $u_2$. The transmitter wants to transmit information bits which are segmented into blocks of K bits to the receiver. A channel encoder processes a first block of information bits $u_1$ and outputs a block of N code bits $x_1$ which we call codeword. The first transmission $x_{11}$ to the receiver contains a punctured version of the codeword which consists of M code bits. The puncturing is done by a H-ARQ functionality. At the receiver, $y_{11}$, which is a disturbed version of $x_{11}$, is received. The H-ARQ functionality at the receiver transforms $y_{11}$ to $y_1$. The parts in $y_1$ which correspond to bits of $x_1$ which are not transmitted are filled with the log-likelihood value of 0 because there is no information available at the receiver about these bits. If the receiver cannot decode the codeword without error (an integrity check can be done with Cyclic Redundancy Check), a retransmission $x_{12}$ from the transmitter is necessary. Note that the error detection can be done with a cyclic redundancy check (CRC) which has to be attached to the block $u_1$ before encoding. The receiver stores the first transmission $y_{11}$ and the transmitter sends another subset $x_{12}$ with M code bits in the second transmission. Both parts of the codeword which were received are used for decoding like it is described in a paper by J. Hagenauer. Rate-Compatible Punctured Convolutional Codes (RCPC Codes) and their Applications. *IEEE Trans. on Communications*, 36(4):389-400, April 1988. This H-ARQ scheme is called incremental redundancy because the amount of redundancy increases with the retransmission. The next block of information bits, $u_2$ is treated separately from the first block $u_1$. The process is summarized in the flow diagram of FIG. 1A.

SUMMARY

In accordance with the present invention, a method is provided for transmitting information comprising transmitting a first block of information; and transmitting the first block of information jointly (i.e., embedded) with a second block of information.

In one embodiment, a method is provided for transmitting information comprising: transmitting a first block of information; and transmitting the first block of information, the first block of information being embedded with a second block of information.

In one embodiment, a method is provided for transmitting information comprising: transmitting a first block of information; and transmitting the first block of information, bits of the first block of information being embedded into bits of a second block of information.

In one embodiment, a method is provided for transmitting information comprising: transmitting a first block of information; and transmitting the first block of information, bits of the first block of information being combined with bits of a second block of information.

In one embodiment, a method is provided for transmitting information comprising: transmitting a first block of information; and transmitting the first block of information, with each one of the bits of the first block of information being combined with a corresponding one of bits of a second block of information.

In one embodiment, the invention, a method is provided for transmitting information comprising: transmitting a first block of information; detecting errors in the first block of information; and, if errors are detected, transmitting the first block of information embedded within a second block of information.

In one embodiment, a method is provided for transmitting information in a H-ARQ system comprising: embedding retransmission of a first block of information with a second block of information if retransmission for the first block is necessary.

In one embodiment, the embedded retransmission of the first block of information is combined using XOR.

With such method additional transmission delay or transmission bandwidth is eliminated while maintaining the capability of re-transmitting the erroneous packets.

In one embodiment, if a retransmission is required for the first block of information, the process transmits both the first block of information and a second block of information embedded with the first block of information.

In one embodiment, an H-ARQ system is provided wherein the transmission of two consecutive, or sequential blocks of information bits are considered jointly; i.e., embedded one block with the other. If a retransmission for the first block is necessary, the system processes both blocks jointly; i.e., the first block embedded within the second block.

With such an arrangement, a H-ARQ system is provided with cross-packet coding which extends current H-ARQ schemes for point-to-point communications wherein the transmission of two consecutive, or sequential block of information bits is considered jointly; i.e., embedded one block with the other. If a retransmission for the first block is necessary, the system processes both blocks jointly; i.e., the first block embedded within the second block. This allows both blocks to be decoded without errors at the receiver after the retransmission.

In one embodiment, an encoder and a decoder are provided to decode iteratively for a system with H-ARQ with cross-packet coding.

With such H-ARQ with cross-packet coding, the second transmission $x_{12}$ which is normally only used for the decoding of the first block of information bits $u_1$ is processed jointly with a new block of information bits $u_2$ and thus allowing both to support the transmission of $u_1$ and the transmission of $u_2$ jointly; i.e., the transmission of $u_1$ embedded within the transmission of $u_2$.

In one embodiment, FEC is done still on the bit level even if the coding for two packets is considered jointly.

In one embodiment, the H-ARQ with cross-packet coding the second transmission $x_{12}$ which is normally only used for the decoding of the first block of information bits $u_1$ is processed jointly with a new block of information bits $u_2$ and thus, allow both to support the transmission of $u_1$ and the transmission of $u_2$.

In one embodiment, a method is provided for transmitting information in a H-ARQ system comprising: embedding re-transmission of a first block of information with a second block of information if retransmission for the first block is necessary where codewords for both the first transmission and the embedded re-transmission are decoded iteratively at the receiver.

In one embodiment, an encoder and a decoder are provided which can be decoded iteratively for a system with H-ARQ with cross-packet coding.

In one embodiment, the embedded retransmission of the erroneous packet is combined with the new packet to be transmitted. The embedment can be done with hard combining using XOR or soft combining with probabilistic approach. The point of packet combining can be done at various points including at the input of the channel encoder, at the output of the channel encoder, or at the output of the channel modulator. Here the channel modulator block is omitted. The channel modulator is the last block in the transmitter chain before the signal is sent out over the medium.

When the receiver cannot successfully decode the packet, it automatically triggers the retransmission. At the transmitter, it sends new information with embedded retransmitted information. Since the receiver knows a priori information, it can extract some of embedded information from the newly received packet and start the decoding process or use a priori information to assist decoding. Some of the residue at this stage can be considered as interference. If the decoding of new information is successful, the receiver can then use this information to decode retransmitted information. Chase combining may also be used to combine the original transmission and the re-transmission.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 2:
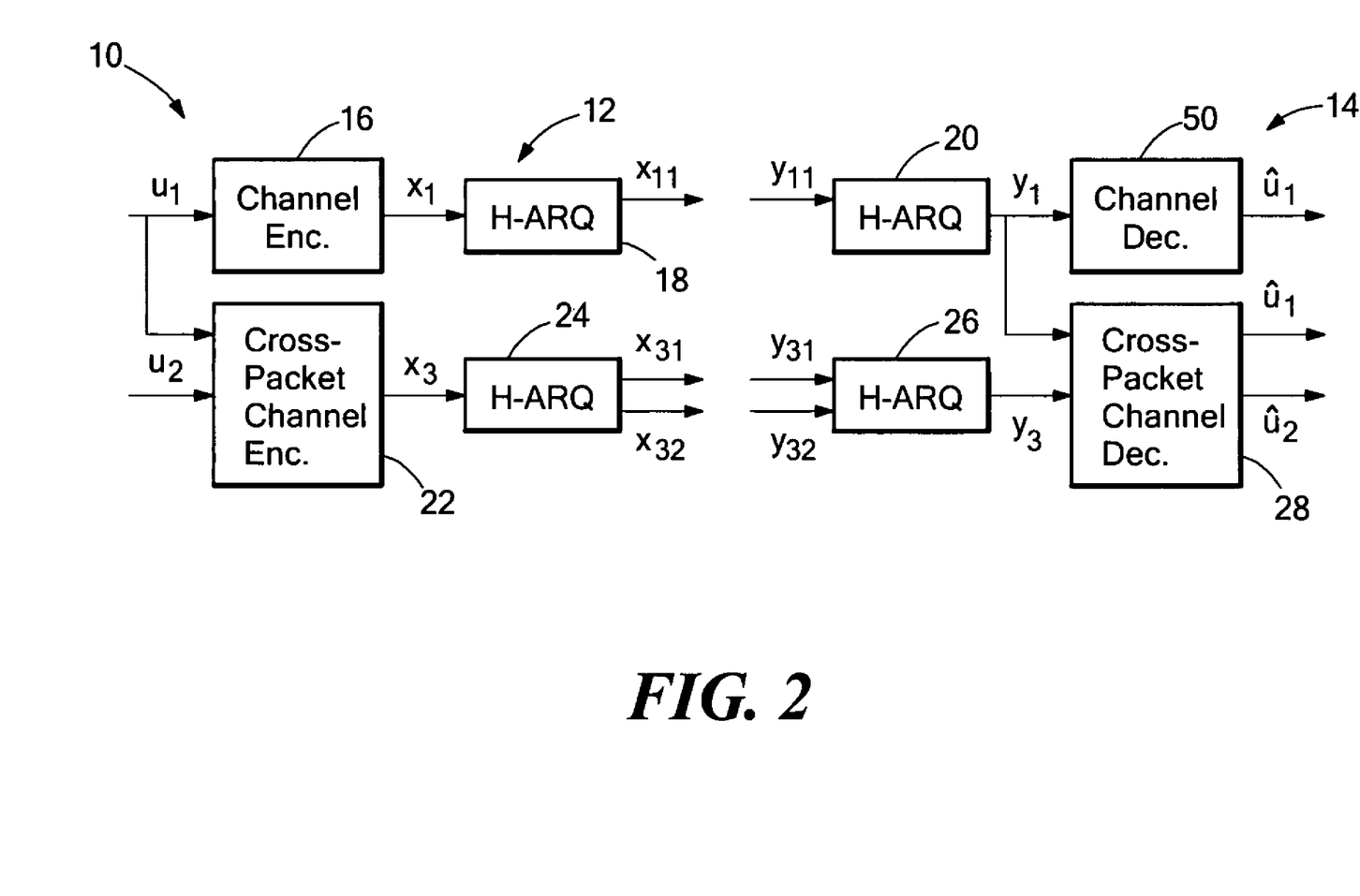
FIG. 2 is a block diagram of a Hybrid Automatic Repeat-reQuest (H-ARQ) system according to the invention.
Figure 2A:
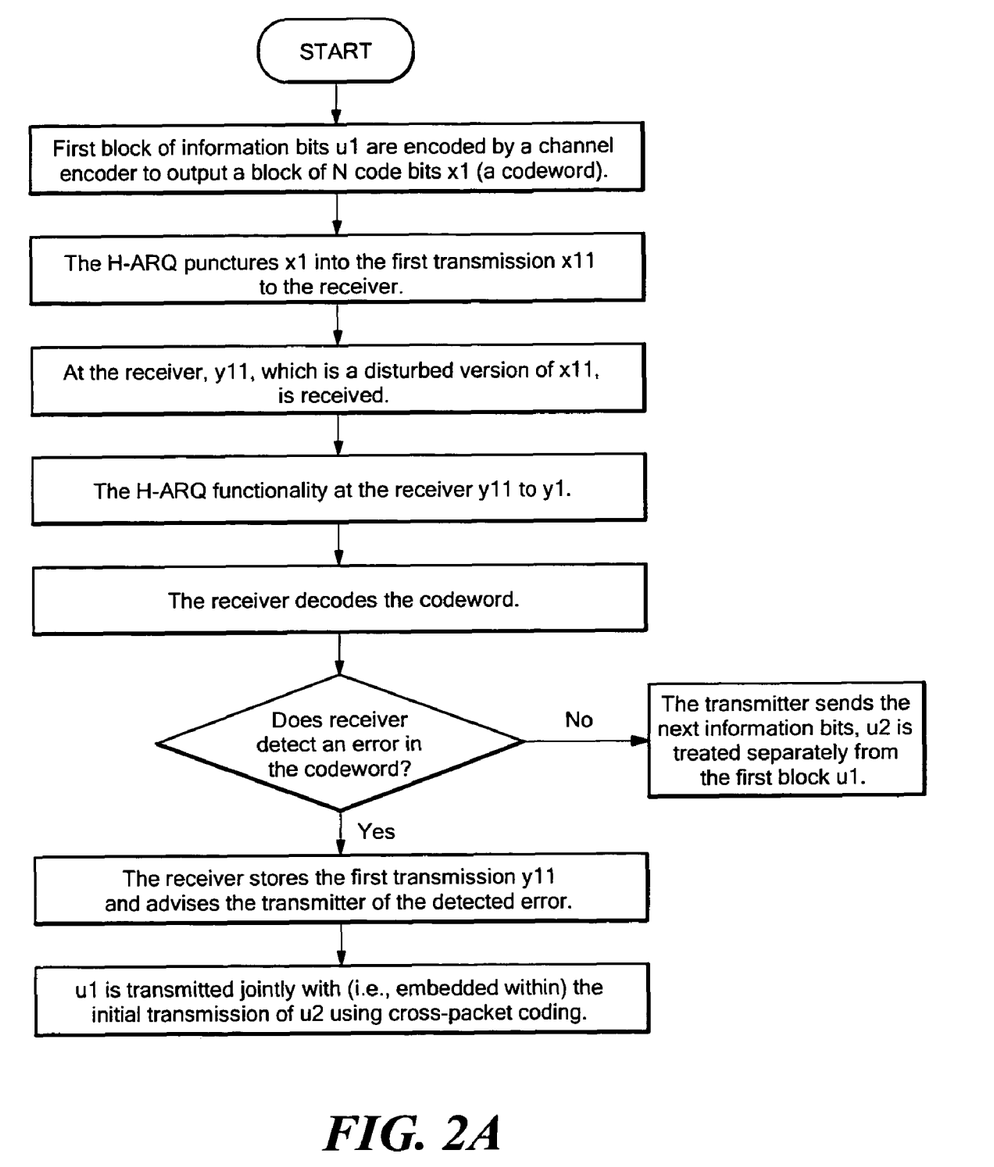
FIG. 2A is a flow diagram of the process used by the Hybrid Automatic Repeat-reQuest (H-ARQ) system of FIG. 1 according to the invention.

Referring now to FIG. 2, a transmission system 10 for transmitting two blocks of information bits $u_1$ and $u_2$ is shown with H-ARQ and cross-packet coding. Briefly, the first transmission $x_{11}$ is the same as in the system without cross-packet coding (FIG. 1). Thus, the transmitter 12 wants to transmit information bits $u_1$ which are segmented into blocks of K bits to a receiver 14. A channel encoder 16 processes the first block of information bits $u_1$ and outputs a block of N code bits $x_1$ which we call codeword. The first transmission $x_{11}$ to the receiver 14 contains a punctured version of the codeword which consists of M code bits. The puncturing is done by a H-ARQ 18 functionality. At the receiver 14, $y_{11}$, which is a disturbed version of $x_{11}$, is received. The H-ARQ functionality 20 at the receiver 14 transforms $y_{11}$ to $y_1$. The parts in $y_1$ which correspond to bits of $x_1$ which are not transmitted are filled with the log-likelihood value of 0 because there is no information available at the receiver about these bits. If the receiver 14 cannot decode the codeword without error (an integrity check can be done with Cyclic Redundancy Check) with the channel decoder 40, a retransmission $x_{12}$ from the transmitter 10 is necessary. Note that the error detection can be done with a cyclic redundancy check (CRC) which has to be attached to the block $u_1$ before encoding. Here, however, if the receiver 14 requires a retransmission, $u_1$ is allowed to be retransmitted jointly, i.e., embedded within, the initial transmission of the second block of information bits to be transmitted, $u_2$ using cross-packet coding. There are a number of possible realizations of this joint transmission such as those shown in FIGS. 3, 5 and 6, to be described. The cross-packet channel encoder 22, shown and to be described in more detail in FIG. 3, outputs the code word $x_3$ which is based on the both inputs $u_1$ and $u_2$. The H-ARQ 24 functionality $x_3$ and outputs the bits $x_{31}$ are sent in the second transmission to the receiver. The H-ARQ 26 functionality at the receiver 14 transforms the channel output $y_{31}$ into $y_3$. The cross-packet channel decoder 28, shown and to be described in more detail in FIG. 4, delivers estimates $\hat{u}_1$ and $\hat{u}_2$ about both blocks of information bits based on $y_1$ and $y_3$. It is also possible to provide a third transmission $x_{31}$. Again, here both blocks $u_1$ and $u_2$ consists of the same number of information bits K and that all transmissions $x_{11}$, $x_{31}$ and $x_{32}$ contain the same number of code bits M. Thus, when the receiver 14 cannot successfully decode the packet, it automatically triggers the retransmission. The transmitter 10 sends new information $u_2$ with embedded retransmitted information $u_1$. Since the receiver 14 knows a priori information about $u_1$ from the previous transmission, it can extract some of embedded information from the newly received packet and start the decoding process or use a priori information to assist decoding. Some of the residue at this stage can be considered as interference and may impact the decoding performance of $u_2$. After the first decoding, the receiver 14 gets both estimates $\hat{u}_1$ and $\hat{u}_2$ from the channel decoder 42. The new estimate $\hat{u}_1$ can then be used as a priori information for the channel decoder 40. It is possible to iteratively exchange information about $u_1$ and $u_2$ between the two channel decoders 40 and 42 to improve the successful decoding probabilities of $u_1$ and $u_2$. Chase combining may also be used to combine the original transmission and the re-transmission. The process is summarized in the flow diagram of FIG. 2A.

Cross-Packet Channel Encoder 22

Figure 3:
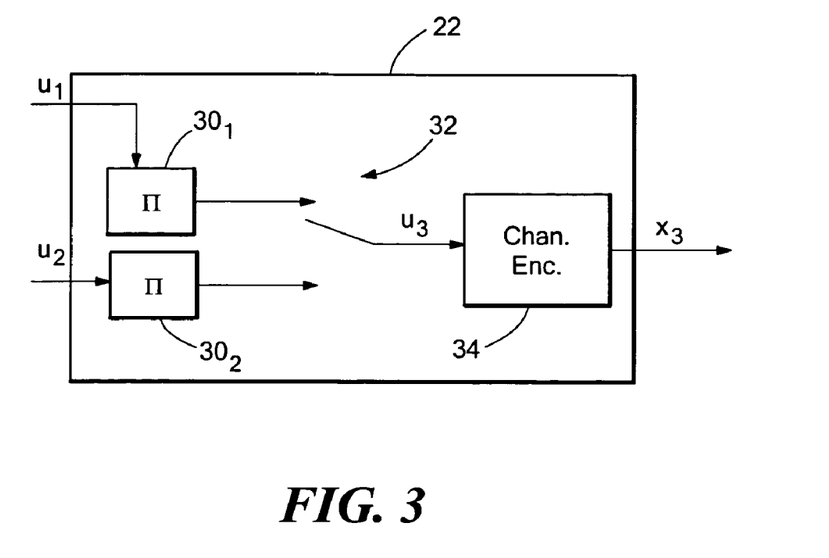
FIG. 3 is a block diagram on a cross packet channel encoder used in the system of FIG. 2 wherein a point of packet combining is performed at the input of the channel encoder.

Referring now to FIG. 3, the cross-packet channel encoder 22 is shown. Both blocks of information bits $u_1$ and $u_2$ are inter-leaved in interleavers $30_1$ and $30_2$, respectively, and appear then alternatively (e.g., time multiplexed) in multiplexer 32) at the input of a channel encoder 34. The input of the channel encoder 34 is termed $u_3$. The input $u_3$ contains 2 K bits. The block $u_3$ is channel encoded to obtain the output $x_3$. The output $x_3$ of the cross-packet channel encoder 22 has approximately double length compared to the output of a conventional channel encoder 16. However, more bits can be punctured in the H-ARQ block which outputs $x_{31}$ with the same size as $x_1$ (M bits). To reduce the complexity at the H-ARQ block 24, the channel encoders 16, 22 are systematic. However, the channel encoders 16 and 22 are not required to be systematic.

Cross-Packet Channel Decoder 28

Figure 4:
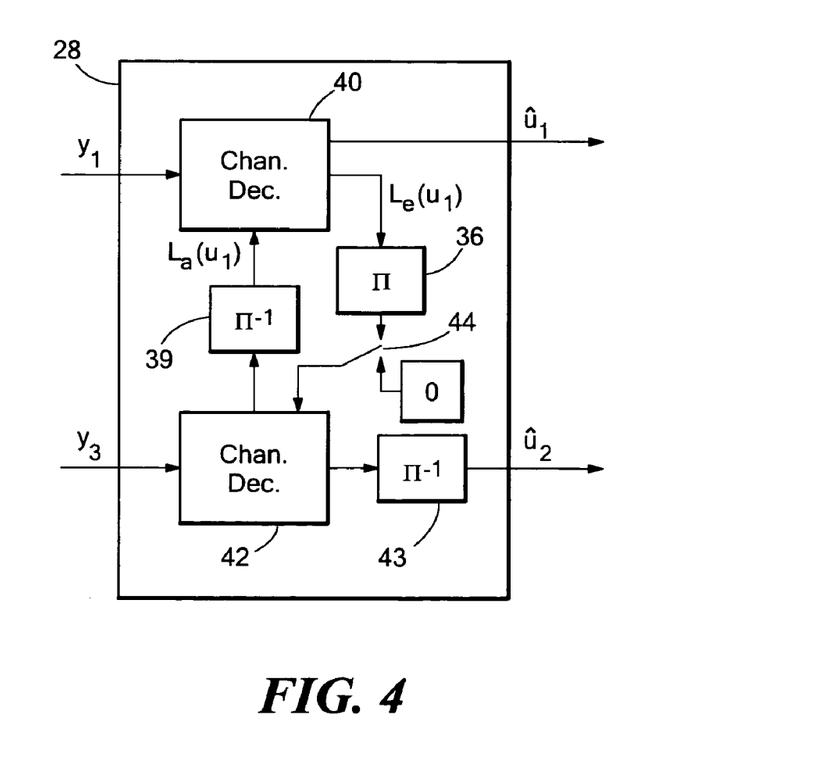
FIG. 4 is a block diagram of a cross packet channel decoder used in the system of FIG. 2.

Referring now to FIG. 4, the cross-packet channel decoder 28 is shown. Here, the cross-packet channel decoder 28 applies the turbo principle in a paper by J. Hagenauer. The Turbo principle: Tutorial introduction and state of the art. In *Proc. International Symp. on Turbo Codes and Related Topics*, Brest, France, September 1997. The cross-packet channel decoder 28 delivers the estimates $\hat{u}_1$ and $\hat{u}_2$ based on the channel outputs $y_1$ and $y_3$.

First, the channel decoder 40 which corresponds to the turbo encoder of $u_1$ calculates extrinsic information i.e. log likelihood ratios $L_e(u_1)$ from its input $y_1$. Then, the second channel decoder 42 which corresponds to the encoder of $u_3$ tries to decode $u_3$ based on the channel output $y_3$ and on a priori information about $u_1$ which is provided from the first channel decoder 40. The extrinsic information $L_e(u_1)$ has to be interleaved in interleaver 36 and mixed with zeros in mixer 44 in order to obtain a priori information for $u_3$. After a de-interleaver 39, the second channel decoder 42 can deliver a priori information $L_a(u_1)$ about $u_1$ which can be exploited again by the first channel decoder 40. It is possible to apply the turbo principle and to iteratively exchange soft information about $u_1$ between the two decoders 40, 42 several times.

The decoders 40, 42 are here soft-in/soft-out decoders such as those used in the convolutional codes in the parallel concatenated convolutional code (PCCC) channel encoder which uses a linear approximation as in a paper by J.-F. Cheng and T. Ottosson. Linearly approximated log-map algorithms for turbo coding. In *Proc. IEEE Vehicular Technology Conference (VTC)*, Houston, Tex., May 2000 to the optimal log-MAP algorithm in decoders 40 and 42. This approximation is compared with other versions of the log-MAP algorithm in the paper by M. C. Valenti and J. Sun. The Universal Mobile Telecommunications System (UMTS) Turbo Code and an Efficient Decoder Implementation Suitable for Software-Defined Radio. *Intern. Journal of Wireless Information Networks*, 8(4):203-215, October 2001. According to the paper by M. C. Valenti and J. Sun, the linear approximation provides a good trade-off between accuracy and complexity.

Example of channel code used in cross packet coding (Convolutional Turbo Code) As noted above, the cross-packet channel encoder 22 and decoder 28 are shown in FIGS. 3 and 4, respectively. Here, a specific code design is used for the cross-packet channel encoder 22 and decoder 28. The code design is related to the turbo network code which is described in a paper by C. Hausl and J. Hagenauer, Iterative network and channel decoding for the two-way relay channel. In *Proc. IEEE International Conference on Communications (ICC 06)*, Istanbul, Turkey, June 2006. Whereas in the paper a wireless communication network with three nodes is considered and two blocks of data which were received from other nodes are encoded jointly, i.e., one block embedded one within the other block, here a point-to-point communication is used where two blocks from the same node are encoded jointly. The code design can be still useful to gain diversity with cross-packet coding. The proposed code can be decoded efficiently in an iterative way.

Iterative Cross-Packet Channel Decoding

Here, the method in this example uses a specific code design for the cross-packet channel encoder and decoder. The code design is related to the turbo network code which is described in C. Hausl and J. Hagenauer. Iterative network and channel decoding for the two-way relay channel. In *Proc. IEEE International Conference on Communications (ICC 06)*, Istanbul, Turkey, June 2006.

Cross-Packet Channel Encoder

Referring to both FIG. 2 and FIG. 3, here, in this example both the channel encoder 16 which encodes $u_1$ and the channel encoder 34 in the cross-packet channel encoder 22 which encodes $u_3$ is chosen to be the parallel concatenated convolutional code (PCCC) which is used in UMTS (see 3GPP TR 25.944. *Channel Coding and Multiplexing Examples* (Release 4), June 2001. This code including the required interleaver embedded in PCCC is described in M. C. Valenti and J. Sun. The UMTS Turbo Code and an Efficient Decoder Implementation Suitable for Software-Defined Radio. *Intern. Journal of Wireless Information Networks*, 8(4):203-215, October 2001. The additional interleaver $30_1$ in FIG. 3 is determined according to M. C. Valenti and J. Sun. The UMTS Turbo Code and an Efficient Decoder Implementation Suitable for Software-Defined Radio. *Intern. Journal of Wireless Information Networks*, 8(4):203-215, October 2001. It is noted that the interleaver $30_2$ is not used in this example.

Referring to again to FIG. 3, i.e., the cross-packet channel encoder 22, the information bits of an interleaved version of packet $u_1$ and the bits in the packet $u_2$ appear alternately at the input of a channel encoder 34. The input of the channel encoder 34 is termed $u_3$. The packet $u_3$ is channel encoded to obtain the output $x_3$.

The H-ARQ functionality after both the channel encoder 16 and the cross-packet channel encoder 22 uses regular puncturing schemes, similar to the one described in D. N. Rowitch and L. B. Milstein. On the Performance of Hybrid FEC/ARQ Systems Using Rate Compatible Punctured Turbo (RCPT) Codes. *IEEE Trans. on Communications*, 48(6):948-959, June 2000, to choose for each transmission M out of all code bits. The only differences after cross-packet encoding are that we always puncture the systematic bits of $x_3$ that correspond to $u_1$ because they are already included in the first transmission $x_{11}$ and that stronger puncturing is necessary.

Cross-Packet Channel Decoder 28

Referring again to FIG. 4, the cross-packet channel decoder 28 delivers the estimates $\hat{u}_1$ and $\hat{u}_2$ based on the channel outputs $y_1$ and $y_3$. First, the channel decoder 40 corresponding to the turbo encoder 16 of $u_1$ calculates extrinsic information i.e. log likelihood ratios $L_e(u_1)$ from its input $y_1$. Then, the second channel decoder 42, which corresponds to the encoder 34 of $u_3$ tries to decode $u_3$ based on the channel output $y_3$ and on a priori information about $u_1$ provided from the first channel decoder 40. Once the decoder 42 has knowledge of $u_1$ and $u_3$, $u_2$ can be extracted. The extrinsic information $L_e(u_1)$ has to be interleaved and mixed with zeros in order to obtain a priori information for $u_3$. The second channel decoder 42 can deliver a priori information $L_a(u_1)$ about $u_1$ which can be exploited again by the first channel decoder 40. It is possible to apply the turbo principle and iteratively exchange soft information about $u_1$ between the two decoders 40, 42 several times. Since the interleaver $30_2$ in this example is not used, the de-interleaver 43 is not used as well.

The soft-in/soft-out decoders 40, 42 for the convolutional codes in the PCCC uses a linear approximation, see J.-F. Cheng and T. Ottosson. Linearly approximated log-map algorithms for turbo coding. In *Proc. IEEE Vehicular Technology Conference (VTC* 00), pages 2252-2256, Houston, Tex., May 2000, to the optimal log-MAP algorithm. All PCCC channel decoders 40 and 42 use 10 iterations and the cross-packet channel decoder uses 2 iterations.

Extension to Other Channel Codes

It is now relatively straightforward to use other channel codes with this invention given that the code used in the encoder 22 and the decoder 28 allow an exchange of decoding information as previously described. Examples of such codes are Block Turbo Code and Low Density Parity Check Code (LDPC).

More particularly, $y_{11}$ is the received version of $x_{11}$. The H-ARQ 20 (FIG. 2) produces $y_1$, which is a reconstructed version of $x_1$. The channel decoder 50 (FIG. 2) then tries to reconstruct $u_1$. If there is no error (an integrity check can be done with Cyclic Redundancy Check), the receiver 14 informs the transmitter 12 of successful reception. The transmitter 12 then sends new information and the decoder 50 performs the operation in the same way. If errors occur, the receiver 14 requests a retransmission from the transmitter 12 and keep the information relevant to $y_1$ (or the estimate of $u_1$) for further processing. The transmitter 12 then forwards both retransmitted and new information to the encoder 22 jointly. Interleavers $30_1$ and $30_2$ (FIG. 3) may be used to scramble information for better coding performance. Note that the scrambling sequences of interleavers $30_1$ and $30_2$ may be different. The channel encoder 22 generates another codeword $x_3$, which is typically larger than $x_1$. The H-ARQ 24 is then used again to reduce the size of this codeword to fit the allocated bandwidth and transmit $x_{31}$.

Further, $y_{31}$ is the received version of $x_{31}$ and H-ARQ 26 generates $y_3$ as the estimate of $x_3$. The channel decoder 28 uses a priori information of $y_1$ (or the estimate of $u_1$) to aid decoding along with $y_3$, estimates $u_2$, and generates the new estimate of $u_1$. The decoder 28 then again uses previously stored values of $y_1$, along with the new estimate of $u_1$ as a priori information, and tries to get the new estimate of $u_1$. The process can be repeated in an iterative manner.

Figure 5A:
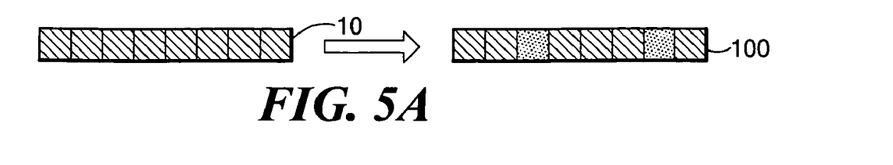
FIGS. 5A-5G are diagrams useful in understanding redundancy-free retransmission used in the Hybrid Automatic Repeat-reQuest (H-ARQ) system according to the invention.
Figure 5B:
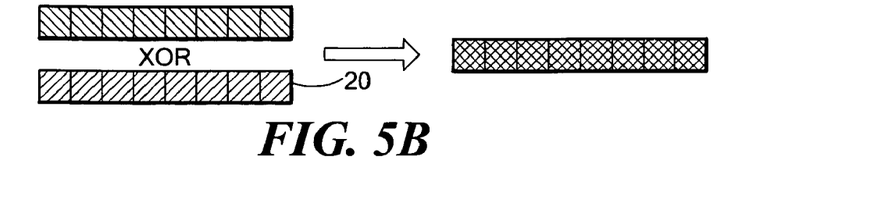
Figure 5C:
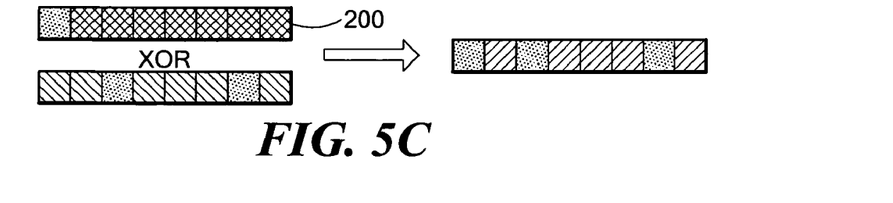
Figure 5D:
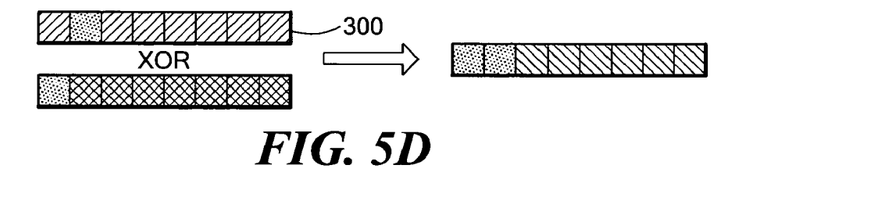
Figure 5E:
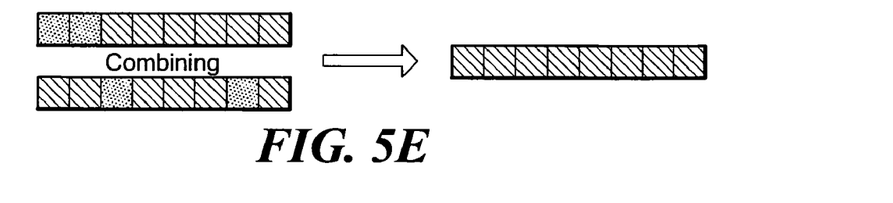
Figure 5F:
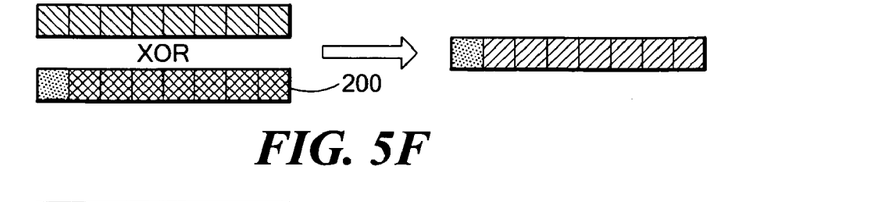
Figure 5G:
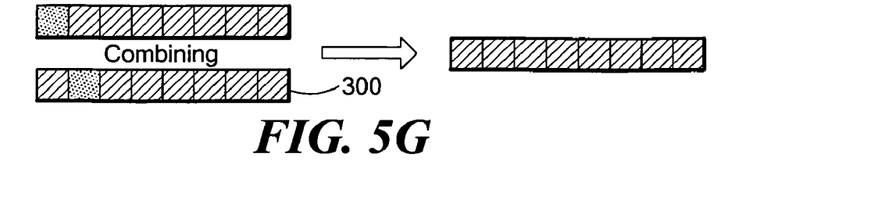
Figure 6:
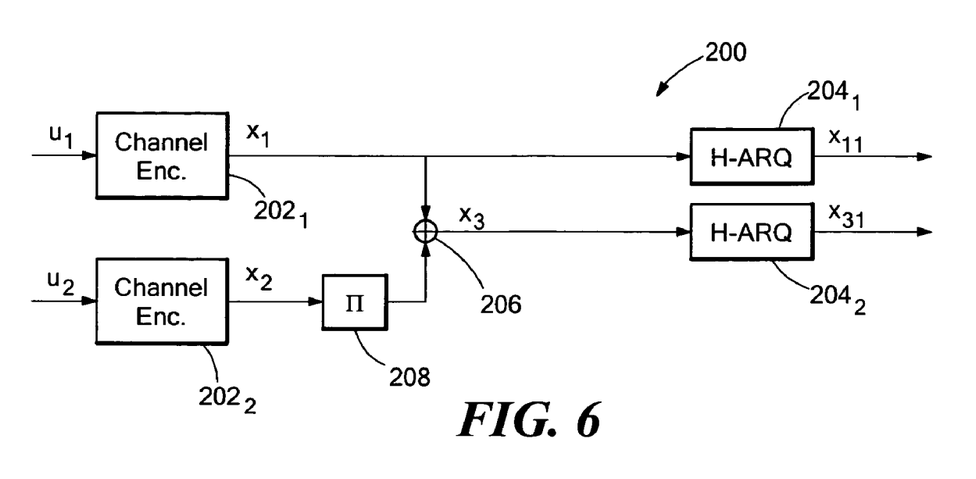
FIG. 6 is a block diagram of a transmitter of a Hybrid Automatic Repeat-reQuest (H-ARQ) system according to the invention wherein a point of packet combining is performed at the input of the channel encoder.

Before discussing the system of FIG. 6, reference is made to FIGS. 5A-5G which illustrates an example of redundancy-free retransmission. In this example, hard combining of coded information is used with Chase combining. FIG. 5A shows the transmission of the original packet 10 and corresponding errors. The receiver stores the erroneous packet 100 and waits for retransmission. Next, the transmitter combines the previous transmission 10 with the current one 20 with a simple XOR operation (hard combining) (FIG. 5B). Next, the transmitter also informs the receiver of this operation and transmits the packet. The packet 200 may arrive at the receiver with some errors due to channel noise and interference. The receiver performs an XOR operation to extract new information as shown in FIG. 5C. After forward error correction, there might be some uncorrectable errors in the packet 300 and the receiver performs another XOR operation to obtain information about the retransmitted packet 10 as illustrated in FIG. 5D. Next, the receiver combines information from the first and second transmission and decodes the packet as shown in FIG. 5E. Chase combining may be used for this purpose. Assuming the decoding is successful, correct decoding of the retransmitted packet 10 is obtained. Similarly, in order to decode the packet 20, the receiver repeats steps in FIG. 5C with the correctly decoded packet 10 to get a new estimate of the packet 20 before combining a new estimate with the previously decoded version 300 as shown in FIGS. 5F and 5G. Assuming successful decoding, the packet 20 can be decoded without error. It is possible to iteratively repeat steps shown in FIGS. 5C-5G to improve decoding performance.

It should be noted that this example only illustrates the concept of redundancy-free retransmissions and this invention is not limited to the example given here.

Referring now to FIG. 6, an encoder at the transmitter 200 of a system with cross-packet coding (XOR) after channel encoding is shown. First and the second block of information bits $u_1$ and $u_2$, are passed to channel encoders $202_1$ and $202_2$, respectively, to obtain encoded first and second blocks of codewords $x_1$ and $x_2$, respectively. The codewords $x_1$ are fed to a Hybrid Automatic Repeat-reQuest (H-ARQ) system $204_1$ for transmission to a receiver 400 (FIG. 7) as codeword $x_{11}$. If a retransmission is needed, the codewords $x_1$ are fed to XOR 206 along with the second codewords $x_2$ after such second codewords are passed through an interleaver 208, as shown, the output of the XOR 206 producing a new block $x_3$. The new block $x_3$ is fed to a Hybrid Automatic Repeat-reQuest (H-ARQ) system $204_2$ for transmission to the receiver 400 (FIG. 7) as codeword $x_{31}$.

Figure 7:
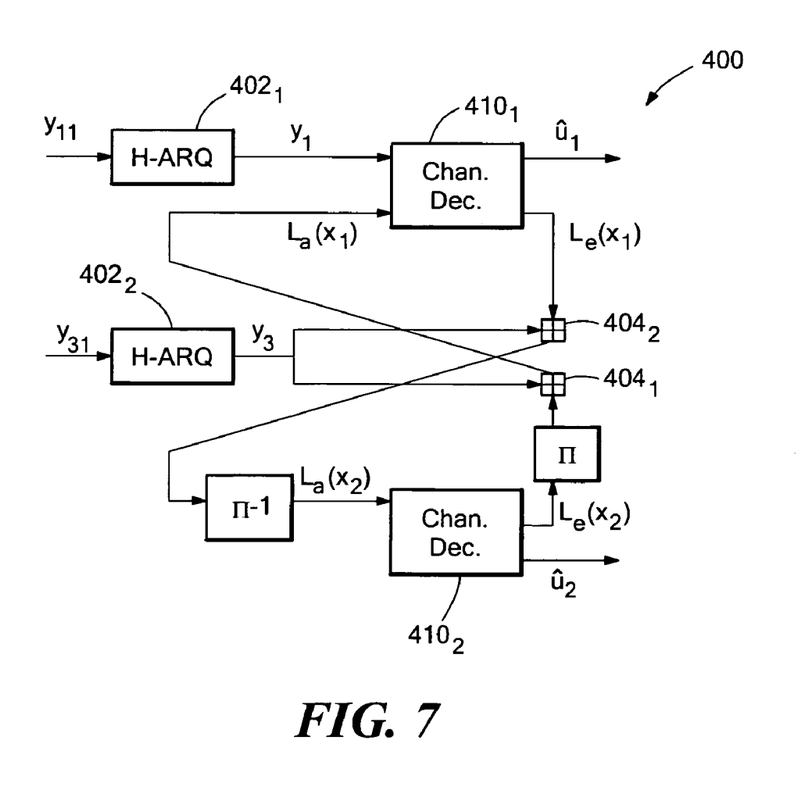
FIG. 7 is a block diagram of a receiver with the transmitter of FIG. 6 in a Hybrid Automatic Repeat-reQuest (H-ARQ) system according to the invention.

Thus, in FIG. 6, $u_1$ and $u_2$ first encoded into the outputs $x_1$ and $x_2$ and the outputs $x_1$ and $x_2$ are combined by the XOR 206 after channel encoding to obtain the output $x_3$. It is noted that there are different possibilities as to when to combine the first and the second block of information bits $u_1$ and $u_2$. For example, they can be combined by an XOR before channel encoding resulting in a new block $u_3$ with the block $u_3$ being channel encoded to obtain output $x_3$ and a part $x_{31}$ of $x_3$ is sent as the second transmission to the receiver 400 (FIG. 7). In both cases, the information is combined with XOR 206 (e.g. $x_3 = x_1 \oplus x_2$). Also the blocks (e.g. $x_3 = x_1 \oplus \Pi(x_2)$) can be interleaved or the blocks (e.g. $x_3 = \Pi([x_1\ x_2])$) may be mixed. In general, all possible linear combinations can be denoted as $x_3 = G_1 u_1 \oplus G_2 u_2$ where $G_1$ and $G_2$ are linear operators.

Thus, referring to FIG. 6, the blocks of information bits $u_1$ and $u_2$ are encoded in to obtain the outputs $x_1$ and $x_2$. The first transmission $x_{11}$ to receiver 400 (FIG. 7) is a part of $x_1$. If the receiver 400 requests a retransmission, the first codeword $x_1$ and an interleaved version of the second codeword $\Pi(x_2)$ are combined to $x_3 = x_1 \oplus \Pi(x_2)$ so that the transmitter 200 transmits the part $x_{31}$ of $x_3$ to the receiver 400.

The receiver 400 (FIG. 7) obtains the channel output $y_{11}$ which is the disturbed version of $x_{11}$. The H-ARQ $402_1$ functionality transforms $y_{11}$ to $y_1$. The parts of the codeword which are not in $y_{11}$ are filled with the soft value 0. The channel decoder $410_1$ obtains the estimate $\hat{u}_1$ from its input $y_1$. If $\hat{u}_1$ is detected to be erroneous, the receiver 400 requests a retransmission from the transmitter 200 (FIG. 6). The receiver 400 then receives the channel output $y_{31}$ which is the disturbed version of $x_{31}$. The H-ARQ $402_2$ functionality transforms $y_{31}$ to $y_3$.

In order to obtain an estimate about the second block of information bits $\hat{u}_2$ the process de-interleaves the output of a box-plus (BOX) operation $404_2$ (such as that described in J. Hagenauer, E. Offer, and L. Papke, "Iterative Decoding of Binary Block and Convolutional Codes", IEEE Trans. on Information Theory, vol. 42, no. 2, pp. 429-445, March 1996) of $y_3$ and $L_e(x_1)$ and obtain a priori information $L_a(x_2) = \Pi^{-1}(y_3 \text{BOXL}_e(x_1)$ about the codeword $x_2$ for the channel decoder $410_2$. $L_e(x_1)$ is extrinsic information about the codeword $x_1$ which is output from the first channel encoder $202_1$ (FIG. 6).

It is noted that it is possible to iteratively exchange soft information about $x_1$ and $x_2$ between the two decoders $410_1$ and $410_2$. In such case, the input to decoder $410_1$ uses a priori information $L_a(x_1) = (y_3 \text{BOX} \Pi (L_e(x_2)))$ about the codeword $x_1$ for the channel decoder $410_1$. $L_e(x_2)$ is extrinsic information about the codeword $x_2$ which is output from the second channel encoder $202_2$ (FIG. 6). Then the two decoders $410_1$ and $410_2$ iteratively exchange information as described above. The values in $y_3$ will not change during the decoding process and the output of the box plus operation $404_1$ and $404_2$ is always limited by the worse of the two inputs.

In operation, when a packet containing data bits, which is transmitted over a medium (wired or wireless), is corrupted due to noise and/or interference, a retransmission is normally needed in order to maintain data's integrity, i.e., files needed to be perfectly reconstructed, the system allows the transmitter to multiplex retransmissions of a corrupted packet with the next transmission of new data, thus reducing the need of additional resources and end-to-end delay. Specifically channel coding and/or data multiplexer can be designed in a way that more than one source of data be combined to form a single packet (cross-packet coding). The receiver is able to extract different data sources with the knowledge of the initial and combined transmissions. It is possible to remove feedback altogether. The idea is to multiplex information with minimal impact on regular transmissions (non-retransmissions). If the first packet is received correctly, the receiver should be able to remove additional information with negligible penalty. Thus a feedback mechanism may not be necessary. Thus, a point-to-point system detection of an error to determine whether a retransmission is required is not necessarily and the first block may be embedded with the second block independent of a detected error. Further, the invention may be used in broadcast or multicast system without detection of an error and in, such case the first block would be embedded with the transmission of the second block.

In another embodiment, the same codeword $x_{11}$ is used for both initial transmission and retransmission. Then at the receiver, soft combining techniques such as Chase combining may be used to jointly decode both transmissions.

It is noted that the use of XOR($\oplus$) or probabilistic combining allows additional information to be multiplexed with regular transmissions. If the first transmission is too noisy, it is possible that the extrinsic information of $x_{11}$ is unreliable and $L_a(x_2)$, a priori information from the previous decoding contains too much residue from the first transmission. This causes error propagation from one codeword to another as described earlier. However if the channel is fully interleaved and the link adaptation is working properly (preferably conservative), the packet errors tend to be bursty and do not span over multiple packets. Therefore the likelihood of successful joint decoding is high due to additional diversity gained from the second retransmission.

It is further noted that this invention can be extended to systems that allow more than one retransmission. Specifically, if the second decoding fails, the transmitter may try to embed the first and second messages to the third transmission. It should also be noted that the system requires additional overhead for acknowledgments. In scenarios where no acknowledgment is used such as the transmission of UDP or multicast packets, it is possible to use H-ARQ with cross-packet coding without any acknowledgement. The first transmission can always be transmitted together with the second transmission. If the first decoding is successful as indicated by the CRC, the residue (the first transmitted codeword) on the second transmission can be completely removed. If not the joint decoding can be used to increase the possibility of successful decoding.

A number of embodiments of the invention have been described. Nevertheless, it will be understood that various modifications may be made without departing from the spirit and scope of the invention. For example, the system can be extended to cross-packet coding more than two packets. Accordingly, other embodiments are within the scope of the following claims.

What is claimed is:

1. A method for transmitting information comprising:
   transmitting a first block of information without embedding within a second block of information;
   detecting errors in the first block of information; and
   if errors are detected, transmitting the first block of information, the first block of information being embedded within the second block of information using XORing.

2. The method recited in claim 1 wherein a receiver decodes the first block of information using a soft combining technique.

3. The method recited in claim 1 wherein the first block of information and the second block of information are sequential blocks of information.

4. The method recited in claim 1 wherein a receiver decodes the first block of information with a probabilistic approach.

5. A method for transmitting information comprising:
   transmitting a first block of information without embedding within a second block of information;
   detecting errors in the first block of information; and
   if errors are detected in the first block of information, transmitting the first block of information, bits of the first block of information being embedded into bits of the second block of information using XORing.

6. The method recited in claim 5 wherein a receiver decodes the first block of information using a soft combining technique.

7. The method recited in claim 5 wherein the first block of information and the second block of information are sequential blocks of information.

8. A system comprising:
   a transmitter for transmitting:
      a first block of information to at least one receiver without embedding within a second block of information;
      determining if errors are detected in the first block of information; and
      if errors are detected, transmitting the first block of information, the first block of information being embedded within the second block of information using XORing, and
   at least one receiver for receiving the transmitted blocks of information.

9. The system recited in claim 8 wherein the transmitter transmits the first block of information;
   wherein the receiver receives the first block of information and determines whether re-transmission of the first block of information is necessary; and
   wherein the transmitter re-transmits the first block of information, this time embedded within second block of information.

10. The system recited in claim 9 wherein the first and second blocks of information are sequential blocks of information.

11. The system recited in claim 10 wherein the system is an H-ARQ system.

12. The system recited in claim 8 wherein the transmitter includes an encoder and the receiver includes a decoder and wherein the decoder decodes iteratively.

13. The system recited in claim 12 wherein the decoder is a soft-in/soft-out decoder for convolutional codes generated in the encoder.

14. The system recited in claim 12 wherein decoder is a soft-in/soft-out decoder.

15. An apparatus comprising:
   a transmitter configured to:
      transmit a first block of information to at least one receiver without embedding within a second block of information;
      determine if errors are detected in the first block of information; and
      if errors are detected, transmit the first block of information, the first block of information being embedded within the second block of information using XORing.

16. The apparatus of claim 15, wherein the transmitter is configured to determine if the errors are detected based on a trigger from the at least one receiver.

* * * * *